(12) United States Patent
Inose et al.

(10) Patent No.: US 6,224,806 B1
(45) Date of Patent: May 1, 2001

(54) METHOD OF MOLDING CAVITY PLATE OF INK JET PRINTER HEAD

(75) Inventors: Toshio Inose; Makoto Kato, both of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/195,158

(22) Filed: Nov. 18, 1998

(30) Foreign Application Priority Data

Nov. 21, 1997 (JP) .................................................. 9-320802

(51) Int. Cl.⁷ .............................. B29C 33/40; B28B 1/24
(52) U.S. Cl. ............................ 264/219; 264/234; 264/629; 264/645
(58) Field of Search ................................... 264/629, 234, 264/219, 299, 645

(56) References Cited

U.S. PATENT DOCUMENTS 5,308,556 * 5/1994 Bagley ................................... 264/13
6,033,619 * 3/2000 Hattori ................................. 264/629

* cited by examiner

Primary Examiner—Christopher A. Fiorilla
(74) Attorney, Agent, or Firm—Oliff & Berridge, PLC

(57) ABSTRACT

A cavity plate of an ink jet printer head is adapted to be attached to a piezoelectric element member and has walls prescribing a plurality of ink storing chambers and a plurality of ink discharge holes. A mold for molding the cavity is provided with: a corniform block member including (i) a plurality of corniform convex portions to mold the ink storing chambers, each having an opening portion on a side of an attachment surface of the cavity plate to be attached to the piezoelectric element member, and (ii) a plurality of corniform concave portions to mold partition walls of the cavity plate for partitioning each of the ink storing chambers; and plurality of pin members to mold the ink discharge holes, which are continuous to the ink storing chambers such that the ink discharge holes have straight tubular portions respectively from the ink storing chambers to ink discharge tip portions at an ink discharge surface of the cavity plate on an opposite side of the attachment surface. The pin members include U-shaped column portions, to mold connection portions between the ink storing chambers and the straight tubular portions, respectively. Each of the U-shaped column portions has (i) a half-cylindrical portion and (ii) a prism portion. The pin members also include cylindrical portions to mold the straight tubular portions respectively.

4 Claims, 9 Drawing Sheets

METHOD OF MOLDING CAVITY PLATE OF INK JET PRINTER HEAD

BACKGROUND OF THE INVENTION

1. Field of the Invention

The present invention relates to a metallic mold for and a method of molding a cavity plate of an ink jet printer head, the cavity plate molded by the same and the ink jet printer head by using the cavity plate.

2. Description of the Related Art

There is an actuator of a head equipped in an ink jet printer, which expands and restores the capacity of many ink storing chambers formed inside the actuator using a piezoelectric element installed corresponding to each of the ink storing chambers, and which applies pressure to the ink inside the ink storing chamber. In this way, the actuator discharges the ink from an ink discharge or nozzle hole formed in each of the ink storing chambers to the external i.e., onto the recording sheet.

As one example of such an actuator, there is an actuator provided with: a cavity plate in which ink storing chambers and ink flow paths to supply the ink to the ink storing chambers are formed; and a nozzle plate which is fixed on the cavity plate and in which fine ink discharge holes are formed.

The cavity plate is produced by injection-molding ceramic such as alumina, and then applying a sintering process to it. In order to uniform the abilities to discharge the ink of all the ink discharge holes, the sizes of the ink storing chambers, the sizes of the ink flow paths and the sizes of the ink discharge holes are uniformed.

However, in the injection-molding process, since a metallic mold is used which is constructed by combining a pin member for forming the ink discharge holes and a corniform member for forming the ink flow paths, a gap is formed between the pin member and the corniform-formed member, resulting in one problem that a burr or flash is generated at the connection portion between these two members when the injection-molding process is finished.

Therefore, the burr or flash is removed by a polishing process. However, the sizes of the burrs or flashes are different from each other at the connection portions between the pin members and the corniform members respectively. Thus, it is difficult to uniform the sizes of the ink storing chambers and the ink flow paths, resulting in another problem that the abilities to discharge the ink of the ink discharge holes cannot be uniformed.

SUMMARY OF THE INVENTION

Given these circumstances, it is an object of the present invention to provide a metallic mold for and a method of molding a cavity plate, which can reduce the burr or flash in the injection-molding process, and a cavity plate which is produced by the molding method.

The above object of the present invention can be achieved by a mold for molding a cavity plate of an ink jet printer head. The cavity plate is adapted to be attached to a piezoelectric element member and has walls prescribing a plurality of ink storing chambers and a plurality of ink discharge holes. The mold of the present invention is provided with: a corniform block member including (i) a plurality of corniform convex portions to mold the ink storing chambers, each having an opening portion on a side of an attachment surface of the cavity plate to be attached to the piezoelectric element member, and (ii) a plurality of corniform concave portions to mold partition walls of the cavity plate for partitioning each of the ink storing chambers, the corniform convex portions and the corniform concave portions being alternatively disposed; and plurality of pin members to mold the ink discharge holes, which are continuous to the ink storing chambers such that the ink discharge holes have straight tubular portions respectively in predetermined lengths from the ink storing chambers to ink discharge tip portions at an ink discharge surface of the cavity plate on an opposite side of the attachment surface. The pin members include: (A) U shaped column portions, a cross section of each of which is in a U letter shape, to mold connection portions between the ink storing chambers and the straight tubular portions respectively, each of the U shaped column portions having (i) a half-cylindrical portion a cross section of which is in a half-circle shape and (ii) a prism portion a cross section of which is in a rectangular shape, at least whose length of one side is equal to a diameter of the half-cylindrical portion, the half-cylindrical portion and the prism portion being integrally formed; and (B) cylindrical portions to mold the straight tubular portions respectively. The U shaped column portions and the cylindrical portions are respectively formed continuously and integrally. The prism portion has an edge surface which contact with an edge surface of respective one of the corniform convex portions at a position corresponding to the connection portions in a condition where the pin members are assembled to the corniform block member.

According to the mold of the present invention, the corniform block member and the pin members are assembled to contact with each other. Then, when an molding process is performed in this assembled condition, the ink storing chambers are molded by the corniform concave portion such that each of the ink storing chambers has an opening portion on the side of the attachment surface. At the same time, the ink discharge holes are molded by the pin members such that each of the ink discharge holes has: the connection portion from the ink storing chamber to the straight tubular portion; and the straight tubular portion from the connection portion to the ink discharge tip portion on the side of the ink discharge surface. More precisely, by the cylindrical portions of the pin members, the straight tubular portions are respectively molded. And that, by the U shaped column portions of the pin members, the connection portions between the ink storing chambers and the straight tubular portions are respectively molded. At this time, in a condition where the pin members are assembled to the corniform block member, since the prism portion of the U shaped column portion has the edge surface, which contact with the edge surface of respective one of the corniform convex portions at a position corresponding to the connection portion, there is generated no or little gap between these contacted edge surfaces of the pin member and the corniform block member. Accordingly, after the molding process by using the mold of the present invention is performed, there is generated no or little burr or flash at the connection portion between the ink storing chamber and the ink discharge hole. Further, since the length of one side of the prism portion of the U shaped column portion is equal to the diameter of the half-cylindrical portion which is integrally formed with the prism portion, the connection portion and the straight tubular portion which are smoothly connected to each other can be obtained as the result of the molding process.

Consequently, such a cavity plate can be molded by using the mold of the present invention that the ink discharging abilities are uniform and stable over the plurality of ink discharge holes or ink nozzles.

In one aspect of the mold of the present invention, the edge surface of the prism portion has a width and a length equal to those of respective one of the corniform convex portions.

According to this aspect, since the prism portion of each of the pin members and the corniform convex portion of the corniform block are smoothly continued at the upper surface and the side surfaces of the corniform convex portion, after the molding process by using the mold of the present invention is performed, there is generated no or little burr or flash at the connection portion between the ink storing chamber and the ink discharge hole. Further, the connection portion and the ink storing chamber which are smoothly connected to each other can be obtained as the result of the molding process.

The above object of the present invention can be also achieved by a method of molding a cavity plate of an ink jet printer head. The cavity plate is adapted to be attached to a piezoelectric element member and has walls prescribing a plurality of ink storing chambers and a plurality of ink discharge holes. The method of the present invention is provided with the process of (I) assembling a plurality of pin members to a corniform block member as a mold. The corniform block member includes (i) a plurality of corniform convex portions to mold the ink storing chambers, each having an opening portion on a side of an attachment surface of the cavity plate to be attached to the piezoelectric element member, and (ii) a plurality of corniform concave portions to mold partition walls of the cavity plate for partitioning each of the ink storing chambers. The corniform convex portions and the corniform concave portions are alternatively disposed. The pin members to mold the ink discharge holes, which are continuous to the ink storing chambers such that the ink discharge holes have straight tubular portions respectively in predetermined lengths from the ink storing chambers to ink discharge tip portions at an ink discharge surface of the cavity plate on an opposite side of the attachment surface, include: (A) U shaped column portions, a cross section of each of which is in a U letter shape, to mold connection portions between the ink storing chambers and the straight tubular portions respectively, each of the U shaped column portions comprising (i) a half-cylindrical portion a cross section of which is in a half-circle shape and (ii) a prism portion a cross section of which is in a rectangular shape, at least whose length of one side is equal to a diameter of the half-cylindrical portion, the half-cylindrical portion and the prism portion being integrally formed; and (B) cylindrical portions to mold the straight tubular portions respectively, the U shaped column portions and the cylindrical portions being respectively formed continuously and integrally. The prism portion having an edge surface which contact with an edge surface of respective one of the corniform convex portions at a position corresponding to the connection portions in a condition where the pin members are assembled to the corniform block member. The method of the present invention is also provided with the process of (II) molding a material of the cavity plate into the assembled mold.

According to the molding method of the present invention, the corniform block member and the pin members are assembled to contact with each other. Then, the molding process is performed by using this assembled mold. In this molding process, the ink storing chambers are molded by the corniform concave portion such that each of the ink storing chambers has an opening portion on the side of the attachment surface. At the same time, the ink discharge holes are molded by the pin members such that each of the ink discharge holes has: the connection portion from the ink storing chamber to the straight tubular portion; and the straight tubular portion from the connection portion to the ink discharge tip portion on the side of the ink discharge surface. Accordingly, in the same manner as the above described mold of the present invention, after the molding process is performed, there is generated no or little burr or flash at the connection portion between the ink storing chamber and the ink discharge hole. Further, since the length of one side of the prism portion of the U shaped column portion is equal to the diameter of the half-cylindrical portion which is integrally formed with the prism portion, the connection portion and the straight tubular portion which are smoothly connected to each other can be obtained as the result of the molding process.

Consequently, such a cavity plate can be molded by the method of the present invention that the ink discharging abilities are uniform and stable over the plurality of ink discharge holes or ink nozzles.

In one aspect of the method of the present invention, the edge surface of the prism portion has a width and a length equal to those of respective one of the corniform convex portions.

According to this aspect, since the prism portion of each of the pin members and the corniform convex portion of the corniform block are smoothly continued at the upper surface and the side surfaces of the corniform convex portion, there is generated no or little burr or flash at the connection portion between the ink storing chamber and the ink discharge hole. Further, the connection portion and the ink storing chamber which are smoothly connected to each other can be obtained as the result of the molding process.

In another aspect of the method of the present invention, the method is further provided with the process of sintering the molded material.

According to this aspect, the cavity plate can be produced by the molding process and the sintering process.

In another aspect of the method of the present invention, the material comprises ceramic.

According to this aspect, a cavity plate made from ceramic can be produced by the molding method of the present invention.

The above object of the present invention can be also achieved by a cavity plate of an ink jet printer head, adapted to be attached to a piezoelectric element member. The cavity plate of the present invention is provided with: partition walls, each of which is in a corniform convex shape, for partitioning each of a plurality of ink storing chambers, each of which is in a corniform concave shape and each of which has an opening portion on a side of an attachment surface of the cavity plate to be attached to the piezoelectric element member; and discharge hole walls prescribing ink discharge holes, which are continuous to the ink storing chambers such that the ink discharge holes have (i) straight tubular portions respectively in predetermined lengths from the ink storing chambers to ink discharge tip portions at an ink discharge surface of the cavity plate on an opposite side of the attachment surface, and (ii) connection portions between the ink storing chambers and the straight tubular portions respectively, a cross section of each of which on a circumference surface is in a U letter shape including a half-circle along a circle of an opening of each of the straight tubular portions at respective one of the connection portions. The partition walls and the discharge hole walls being smoothly connected to each other at the connection portions respectively.

According to the cavity plate of the present invention, in operation of the ink jet printer head, the ink is discharged from the ink discharging hole which is continuous to the ink storing chambers from the side of the attachment surface to the side of the ink discharge surface. More actually, the ink from the ink storing chamber is supplied through the connection portion and the straight tubular portion to the ink discharge tip portions at the ink discharge surface in each of the ink discharge holes. At this time, the cross section of the connection portion on the circumference surface is in the U letter shape including the half-circle along the circle of the opening of the straight tubular portion, and the partition walls and the discharge hole walls are smoothly connected to each other at the connection portions respectively.

Consequently, the ink can flow smoothly from the ink storing chamber to the ink discharge hole, so that stable ink discharging abilities can be realized over the plurality of the ink discharging holes.

The above object of the present invention can be also achieved by an ink jet printer head provided with: (I) a piezoelectric element member, which has a plurality of piezoelectric elements for selectively changing capacities of ink storing chambers respectively, and (II) the above described cavity plate of the present invention.

According to the ink jet printer head of the present invention, in operation, as the piezoelectric elements are displaced in accordance with information to be printed, the ink is correspondingly discharged through the ink storing chamber and the ink discharging holes in the cavity plate. At this time, since the ink jet printer head is provided with the above described cavity plate of the present invention, the ink can flow smoothly from the ink storing chamber to the ink discharge hole in correspondence with the displacement of the piezoelectric element member, so that the stable ink discharging abilities can be realized over the plurality of the ink discharging holes.

In one aspect of the ink jet printer head of the present invention, the ink jet printer head is further provided with a base member for supporting the piezoelectric element member, the piezoelectric element member being interposed and fixed between the cavity plate and the base member.

According to this aspect, the piezoelectric element member is displaced on the base member and the displacement is transmitted to the cavity plate on the side opposite to the base member.

In another aspect of the ink jet printer head of the present invention, the ink jet printer head is further provided with a partition plate interposed and fixed between the cavity plate and the piezoelectric element member.

According to this aspect, the displacement of the piezoelectric element is transmitted through the partition plate to the ink storing chamber.

In another aspect of the ink jet printer head of the present invention, the ink jet printer head is further provided with a nozzle plate, which is disposed on the ink discharge surface, in which a plurality of nozzle holes connected to respective one of the ink discharge holes are formed.

According to this aspect, the ink supplied through the ink storing chamber and the ink discharging holes is ejected from the nozzle holes of the nozzle plate.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

A preferred embodiment for the present invention is explained with reference to the drawings.

Figure 1:
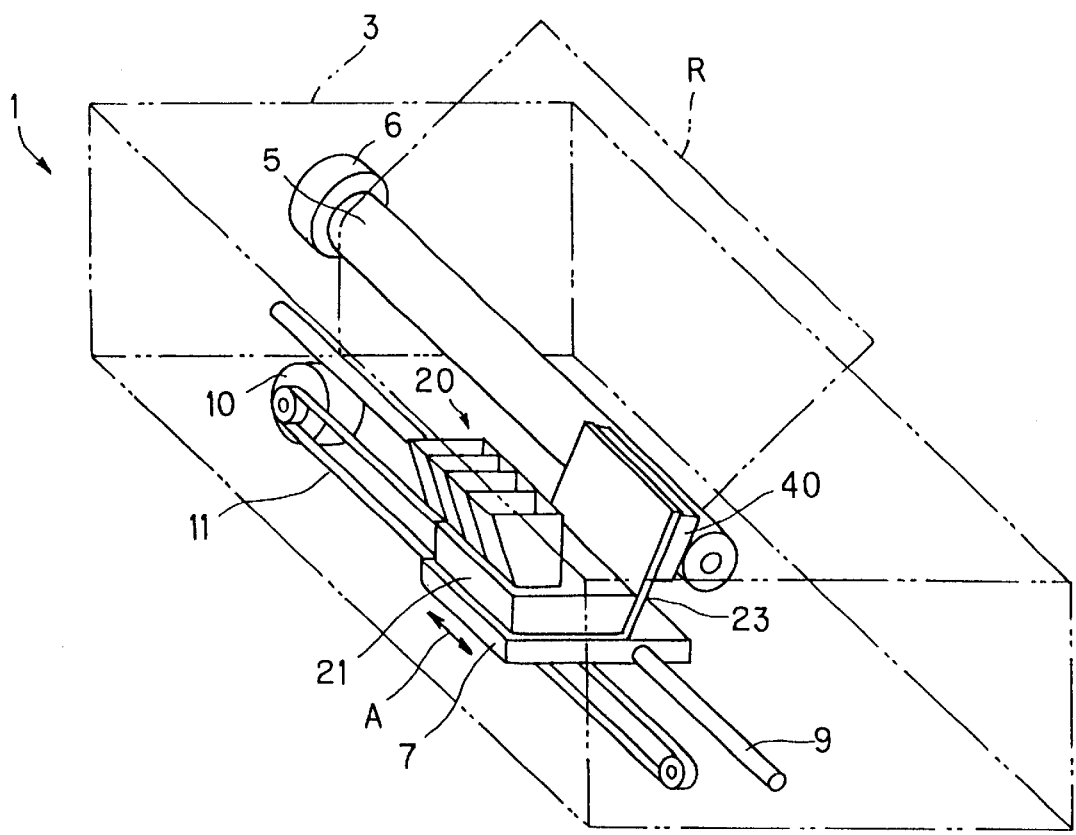
FIG. 1 is a perspective view showing the internal of an ink jet printer 1 according to an embodiment of the present invention.

FIG. 1 is a perspective view showing the internal of an ink jet printer (hereafter, this may be also called simply as a printer) 1 according to an embodiment of the present invention.

In FIG. 1, the printer 1 is provided with a transport roller 5, which is driven by a transport motor 6, for transporting a recording paper R, as one example of a recording medium to be recorded with, toward an upper side of the printer 1 in a frame body 3 thereof. A head 20 supported by a carriage 7 is installed in the transport path of the recording paper R. Moreover, a supporting member 9 that is fixed on the frame body 3 supports the carriage 7 movably in the back and forth directions indicated by an arrow A orthogonal to the transport direction of the recording paper R. In addition, a timing belt 11 which the carriage motor 10 drives fixes the carriage 7, enabling the carriage 7 to move freely the back and forth directions indicated by the arrow A.

The head 20 is provided with: ink tanks 21 for storing inks of four colors (i.e., yellow, magenta, cyan, and black); ink discharging actuators 40 for discharging the inks of four colors; and a front panel 23 for transporting the ink from the respective ink tanks 21 to the corresponding actuators 40.

Figure 2:
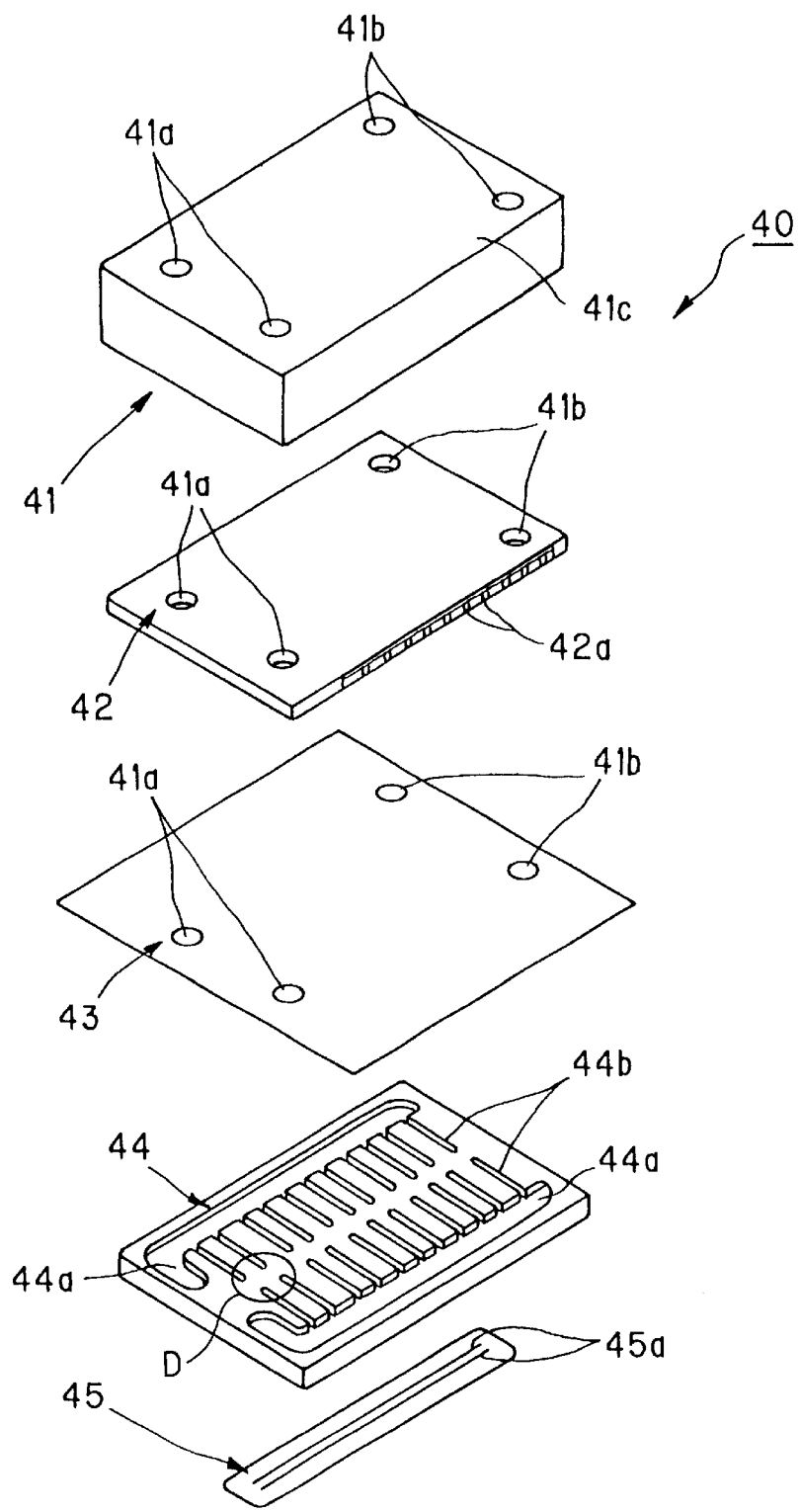
FIG. 2 is a perspective separation view showing an actuator 40 of the printer 1 according to the embodiment of the present invention.

As shown in FIG. 2, each of the actuators 40 is provided with a base 41, a piezoelectric element member 42, a diaphragm 43, a cavity plate 44 and a nozzle plate 45.

The base 41 supports each of the above-described components of the actuator 40.

Figure 3:
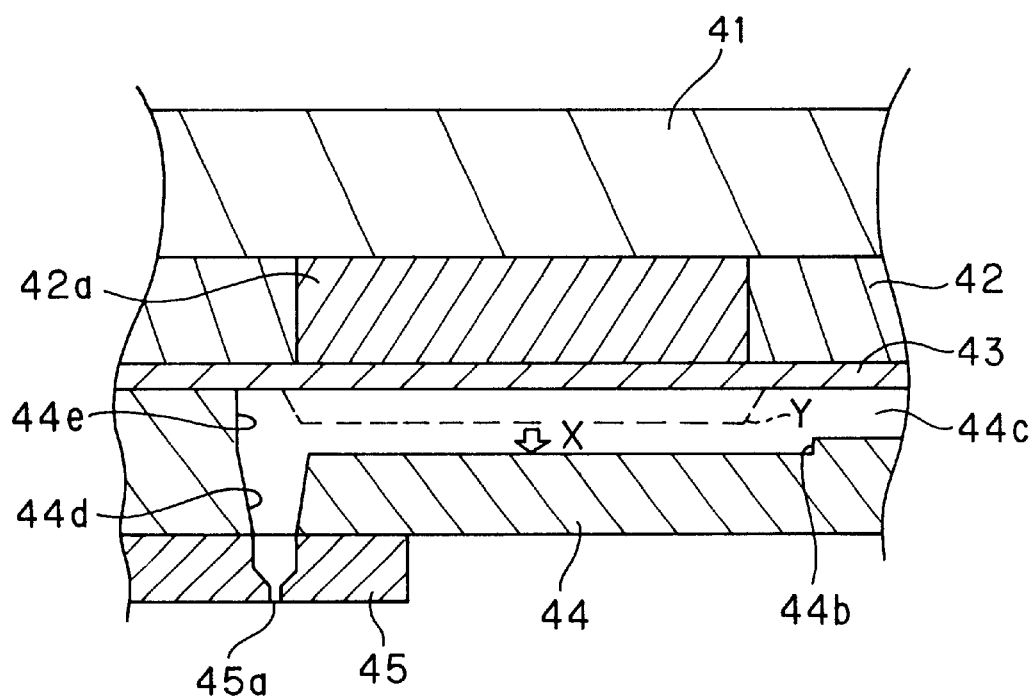
FIG. 3 is a vertical cross sectional view showing a vertical cross section of the actuator 40 of the printer 1 according to the embodiment of the present invention.

The piezoelectric element member 42 is provided with a large number (e.g., 128) of piezoelectric elements 42*a*, so as to expand and shrink individually each of the ink storing chambers 44*b* of the cavity plate 44. When the driving voltage is applied to respective one of the piezoelectric elements 42*a*, the piezoelectric element 42*a* expands in the direction indicated by an arrow X, so as to shrink the capacity of the ink storing chamber 44*b* as indicated by a broken line Y, as shown in FIG. 3 which is a vertical cross sectional view of the actuator 40. When the driving voltage is released, the piezoelectric element 42*a* restores or returns to its original initial state by the elasticity of the diaphragm 43.

The diaphragm 43 separates the piezoelectric element member 42 from the cavity plate 44, and has elasticity.

The cavity plate 44 has two L-shaped ink flow paths 44*a*, and ink storing chambers 44*b* that branch out perpendicularly from the ink flow paths 44*a*. The number of the ink storing chambers 44*b* is equal to the number of the ink discharge holes 45*a*. Each of the ink storing chambers 44*b* is connected to the respective one of the ink discharge holes 45*a*. Further, as shown in FIG. 3, each of the ink storing chambers 44*b* formed on the cavity plate 44 is connected to respective one of the ink flow paths 44*a* via a connecting path 44*c*. An orifice 44*d* for leading the supplied ink to the respective ink discharge hole 45*a* is formed at the bottom of the ink storing chamber 44*b*.

The nozzle plate 45 is a flat plate on which a large number of (e.g., 128) ink discharge holes 45*a* are arranged in two rows respectively.

Incidentally, two forward paths 41*a* and two backward paths 41*b* for circulating the ink from the ink tank 21 in FIG. 1 through the ink flow paths 44*a* penetrate through the base 41, the piezoelectric element 42, and the diaphragm 43.

Next, an operation of discharging the ink from the actuator 40 of the head 20, that is constructed in the above-described manner, will be explained with reference to FIG. 1 to FIG. 3.

The ink is compressed and fed from the ink tank 21 (shown in FIG. 1) to the pair of the ink flow paths 44*a* passing through the pair of forward paths 41*a*, and fills the ink flow path 44*a* (shown in FIG. 2). By releasing the driving voltage, the original state of the piezoelectric element 42*a* is restored. The ink is then guided through the ink flow path 44*a* and the connecting path 44*c*, to be thereby drawn into the ink storing chamber 44*b*. Thus, the ink storing chamber 44*b* is filled with the ink.

Then, by applying the driving voltage to the piezoelectric element 42*a* so as to shrink the capacity of the ink storing chamber 44*b*, the ink is guided through the orifice 44*d* to the ink discharge hole 45*a*, and is discharged outside of the ink storing chamber 44*b*.

By this ink discharge operation of the actuator 40, the ink is discharged from the actuator 40 onto the recording paper R.

Therefore, the ink in the orifice 44*d* is discharged accurately through the nozzle hole i.e., the ink discharge hole 45*a* having a fine diameter formed in the nozzle plate 45.

Figure 4:
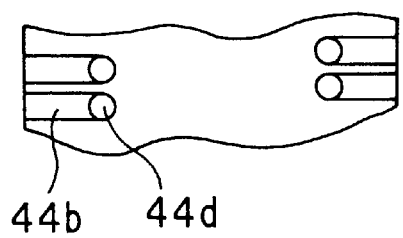
FIG. 4 is an enlarged view of a D portion showing a connection portion of an ink storing chamber and an orifice of FIG. 2.
Figure 11:
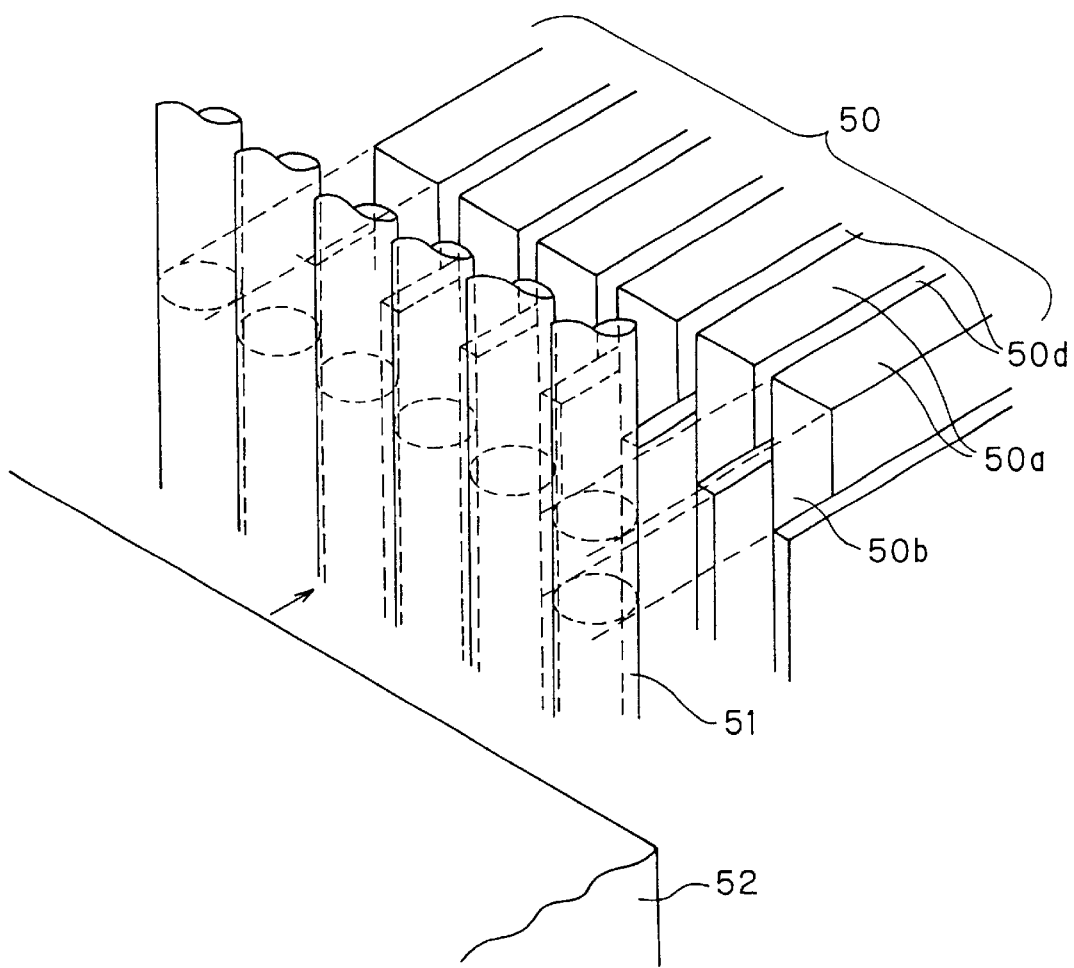
FIG. 11 is a perspective view of a metallic mold in a comparison example.
Figure 12:
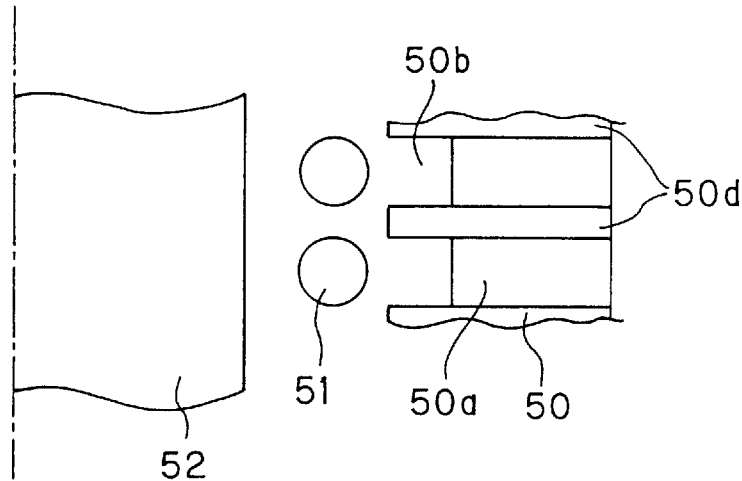
FIG. 12 is a plan view of the metallic mold of the comparison example.

The cavity plate 45 constructed in the above explained manner is a member produced by injection-molding the ceramic such as alumina and then applying the sintering process to it. Thus, the metallic mold is conventionally used. As shown in FIG. 4 which is the enlarged view of a D portion in FIG. 2, the cavity plate 44 has such a structure that the ink storing chamber 44*b*, whose vertical cross section is in a corniform concave shape, and an tubular orifice 44*d*, whose horizontal cross section is in a circle, are connected to each other. Thus, as a comparison example shown in FIG. 11 and FIG. 12, such a metallic mold is used that a cylindrical pin member 51 is inserted or assembled to a recess 50*b* of a corniform block 50 and the cylindrical pin member 51 is abutted onto an edge surface of a corniform convex portion 50*a* of the corniform block 50 by an abutting member 52, so as to respectively form the tubular orifice 44*d* in the circle shape (corresponding to the cylindrical pin member 51) and the ink storing chamber 44*b* in the corniform concave shape (corresponding to the corniform convex portion 50*a*). In other word, partition walls for partitioning the ink storing chamber 44*b* of the cavity plate 44 are molded in correspondence with corniform concave portions 50*d* between the corniform convex portions 50*a*, while discharge hole walls for prescribing the tubular orifices 44*d* of the cavity plate 44 are molded in correspondence with spaces around the cylindrical pin members 51.

Figure 13:
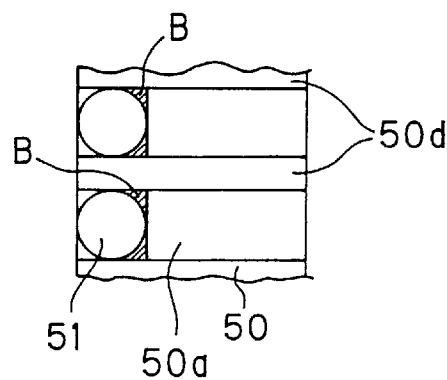
FIG. 13 is a plan view showing a gap generated at a connection portion of the pin member and the corniform member in the metallic mold of the comparison example.
Figure 14:
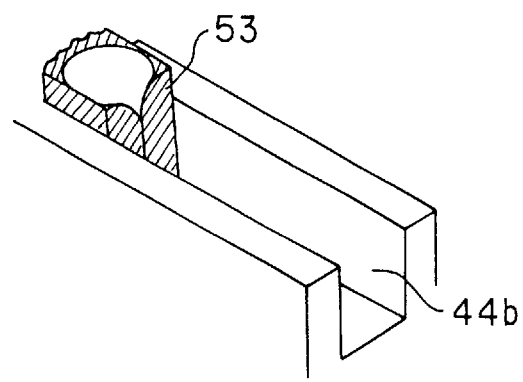
FIG. 14 is a perspective view showing a burr or flash formed in case of performing an injection-molding process by using the metallic mold of the comparison example.

Thus, in this comparison example, at the connection portion between the cylindrical pin member 51 (inserted in the recesses 50*b* of the corniform block 50) and the corniform convex portion 50*a*, a gap B is generated as shown in FIG. 13. Then, if the injection-molding process is performed in this condition where the gap B is generated, a burr or flash 53 is generated in the molded cavity plate 44 as shown in FIG. 14.

Figure 5A:
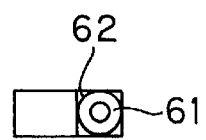
FIG. 5A is a plan view of one example of a pin member of the embodiment.
Figure 5B:
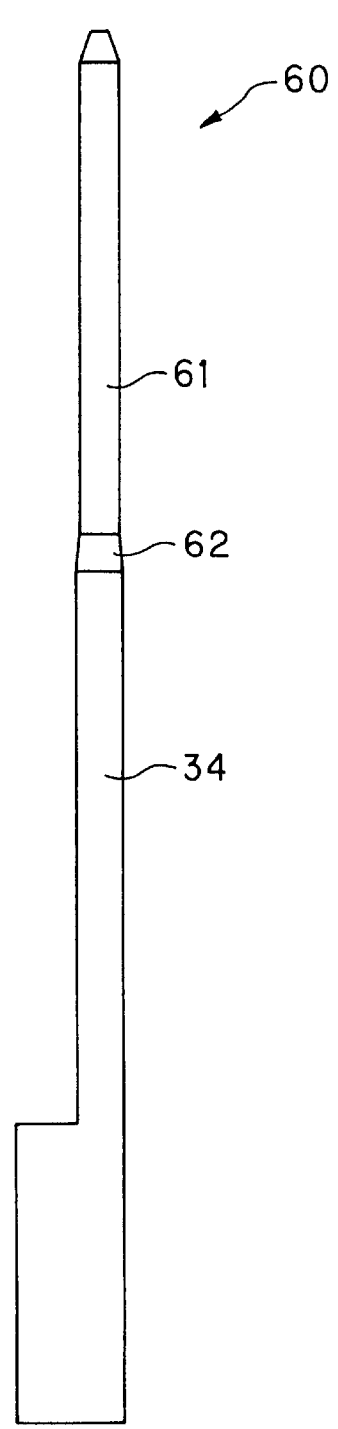
FIG. 5B is a side view of the pin member of FIG. 5A.

Therefore, in the present embodiment, the injection-molding process is performed by using a metallic mold having the pin member 60 as shown in FIGS. 5A and 5B.

Incidentally, FIG. 5A is a plan view from an upper side of the pin member 60 of FIG. 5B. FIG. 5B is a side view of the pin member 60 of the present embodiment. As shown in FIGS. 5A and 5B, in the pin member 60, a cylindrical column portion 61 to form the orifice 44*d* and a U shaped column portion 62 to form a connection portion 44*e* between the orifice 44*d* and the ink storing chamber 44*b* are integrally and continuously formed.

Figure 6:
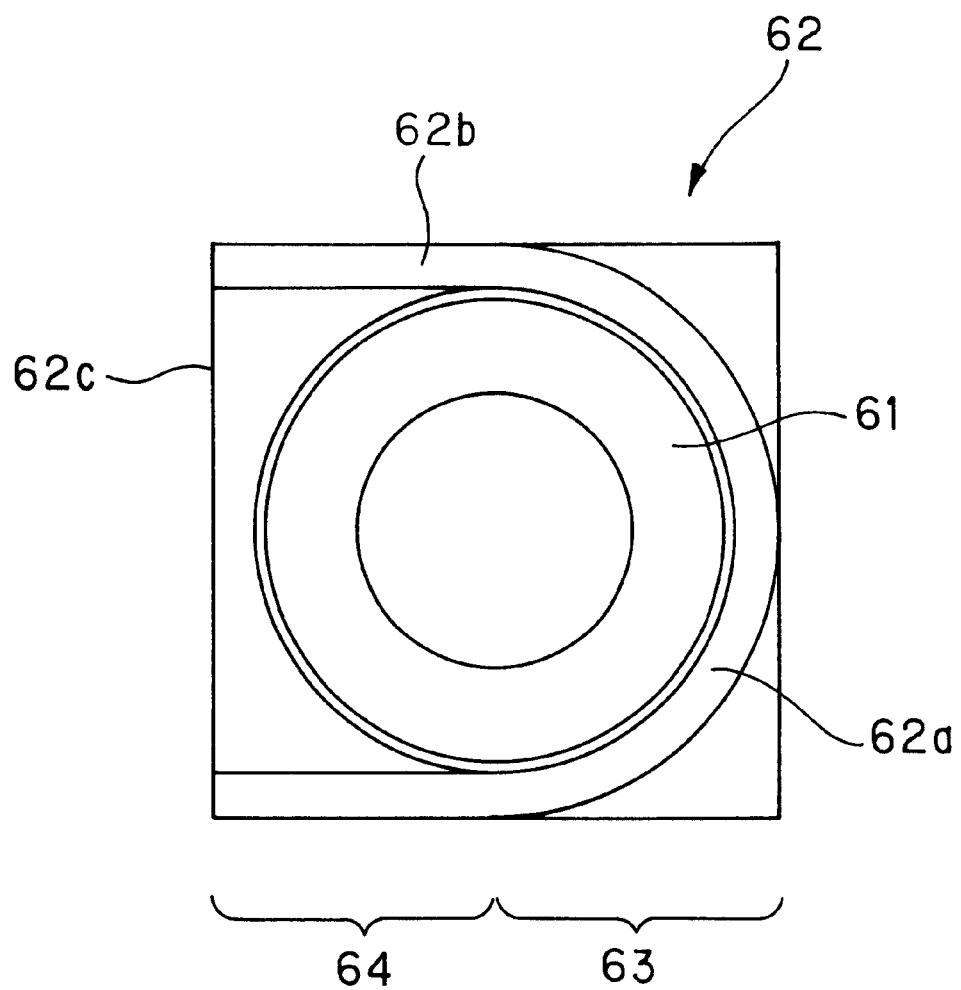
FIG. 6 is an enlarged plan view of a U-shaped column portion of the pin member of FIG. 5A.

As shown in FIG. 6 which is the partial enlarged view of FIG. 5A, the U shaped column portion 62 has (i) a half cylindrical column portion 63 having an inclined surface 62*a* in a conical-shape and (ii) a prism portion 64 in a rectangular shape, whose one side has the length equal to the diameter of the bottom surface of the inclined surface 62*a* in the conical-shape and which has an inclined surface 62*b* which is inclined at an angle equal to that of the inclined surface 62*a* in the conical-shape. Further, as shown in FIG. 7, an edge surface 62*c* of the U shaped column portion 62 (shown in FIG. 6) has a width and a height same as a width W and a height h of the corniform convex portion 65*a* of the corniform block member 65, and is formed in a shape same as a hatched area C in FIG. 7.

Figure 7:
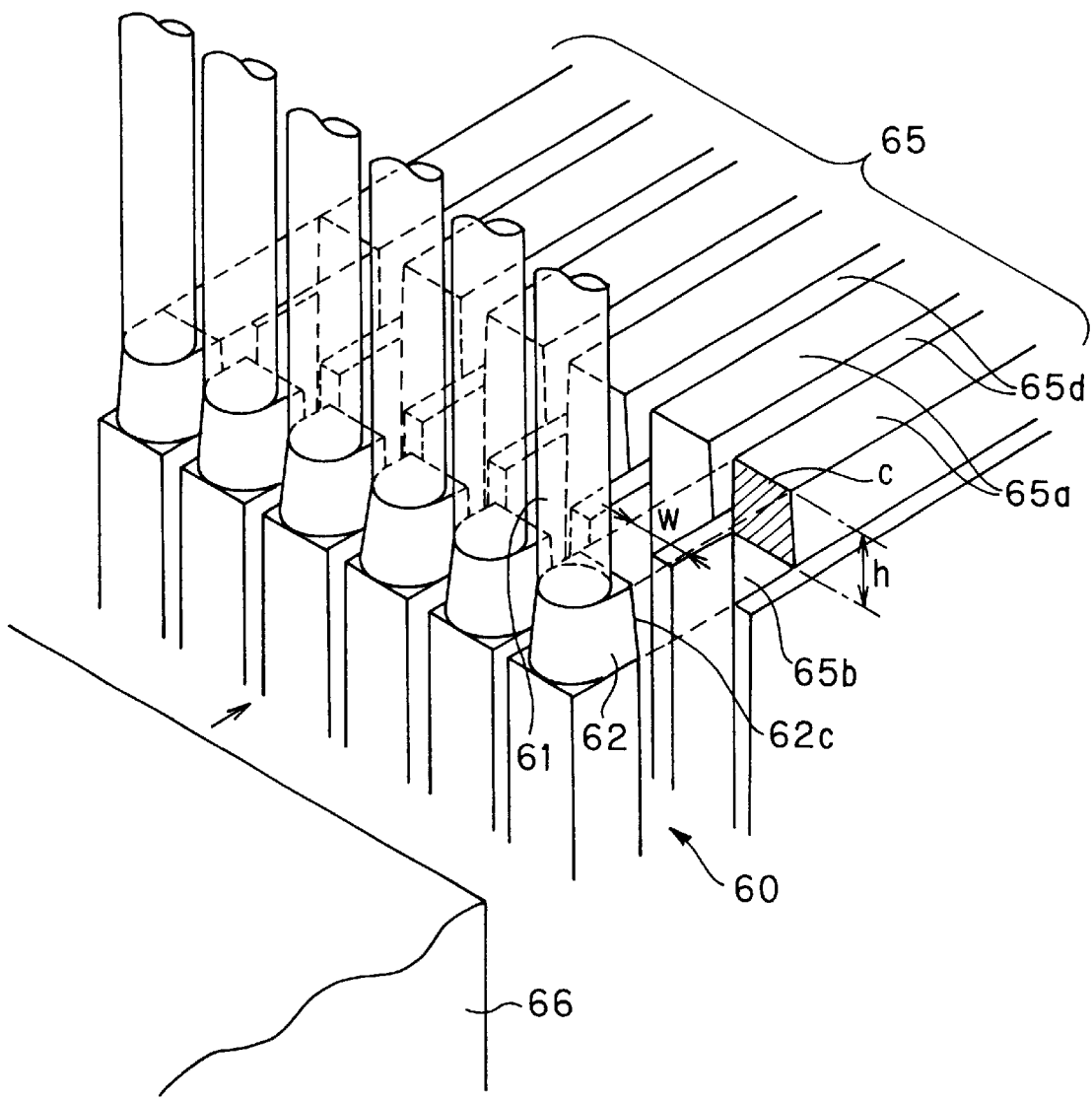
FIG. 7 is a perspective view showing a structure of a metallic mold by using the pin member and the corniform member of the embodiment.
Figure 8:
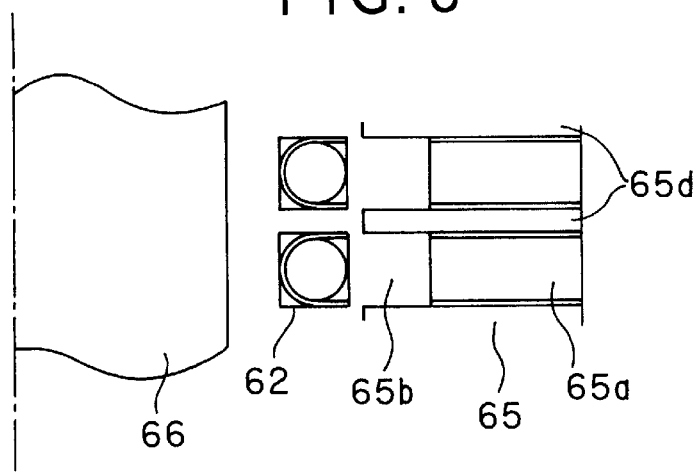
FIG. 8 is a plan view showing a structure of a metallic mold by using the pin member and the corniform member of the embodiment.
Figure 9:
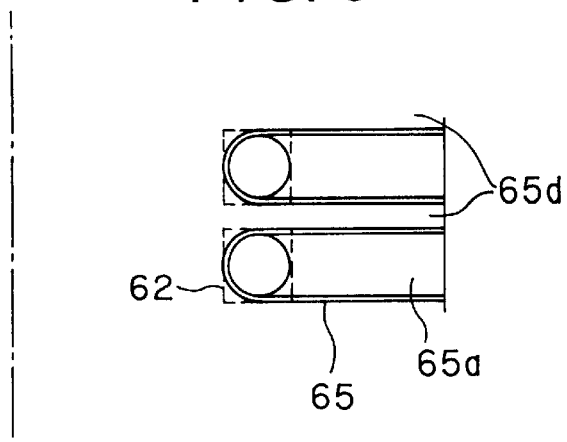
FIG. 9 is a plan view showing a connection portion of the pin member and the corniform member in the metallic mold of the embodiment.
Figure 10:
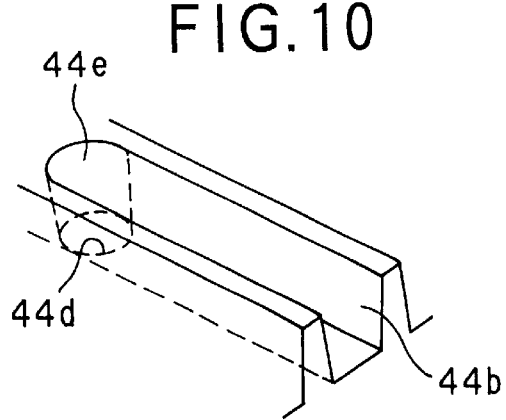
FIG. 10 is a perspective view showing the connection portion of the ink storing chamber and the orifice, which are formed in case of performing an injection-molding process by using the metallic mold of the embodiment.

Therefore, as shown in FIG. 7 and FIG. 8, if the pin member 60 is inserted or assembled to each recess 65*b* of the corniform block member 65 and is abutted to the edge surface of the corniform convex portion 65*a* by the abutting member 66, such a metallic mold is constructed that the U shaped column portion 62 and the corniform convex portion 65a are closely contacted with each other at the hatched area C, and that the upper surface, the side surface etc., of the corniform convex portion 65a are continuous to the surfaces of the U shaped column portion 62 through the close contact. Thus, as shown in FIG. 9, no gap is generated at the connection between the U shape column portion 62 and the corniform convex portion 65a.

As a result, if the injection-molding process is performed by using this metallic mold of the present embodiment, the connection portion 44e between the ink storing chamber 44b and the orifice 44d (as shown in FIG. 3) are made smooth, so that no burr or flash is generated thereat. In other word, partition walls for partitioning the ink storing chamber 44b of the cavity plate 44 are molded in correspondence with corniform concave portions 65d between the corniform convex portions 65a, while discharge hole walls for prescribing the tubular orifices 44d as well as the connection portion 44e of the cavity plate 44 are molded in correspondence with spaces around the U shaped column portion 62.

Therefore, since each pair of the ink storing chamber 44b and the orifice 44d is accurately formed without or with little burr or flash at the connection portion 44e therebetween by using the metallic mold of the present embodiment, the uniformity of the ink discharging abilities of all the ink discharge holes 45a of the ink jet printer head can be promoted. Consequently, an ink jet printer head is realized which can perform an excellent ink discharging process.

The shape of the U shaped column portion 62 is not limited to the above described embodiment, but may be any shape as long as the close contact between the corniform convex portion 65a and the pin member 60 can be maintained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-320802 filed on Nov. 21, 1997 including the specification, claims, drawings and summary is incorporated herein by reference in its entirety.

What is claimed is:

1. A method of molding a cavity plate of an ink jet printer head, said cavity plate being adapted to be attached to a piezoelectric element member and having walls prescribing a plurality of ink storing chambers and a plurality of ink discharge holes, said method comprising the processes of (I) assembling a plurality of pin members to a corniform block member as a mold, said corniform block member comprising (i) a plurality of corniform convex portions to mold the ink storing chambers, each having an opening portion on a side of an attachment surface of said cavity plate to be attached to the piezoelectric element member, and (ii) a plurality of corniform concave portions to mold partition walls of said cavity plate for partitioning each of the ink storing chambers, said corniform convex portions and said corniform concave portions being alternatively disposed, said pin members to mold the ink discharge holes, which are continuous to the ink storing chambers such that the ink discharge holes have straight tubular portions respectively from the ink storing chambers to ink discharge tip portions at an ink discharge surface of said cavity plate on an opposite side of the attachment surface, comprising:

(A) U shaped column portions, a cross section of each of which is in a U letter shape, to mold connection portions between the ink storing chambers and the straight tubular portions respectively, each of said U shaped column portions comprising (i) a half-cylindrical portion a cross section of which is in a half-circle shape and (ii) a prism portion a cross section of which is in a rectangular shape, at least whose length of one side is equal to a diameter of said half-cylindrical portion, said half-cylindrical portion and said prism portion being integrally formed; and (B) cylindrical portions to mold the straight tubular portions respectively, said U shaped column portions and said cylindrical portions being respectively formed continuously and integrally, said prism portion having an edge surface which contact with an edge surface of respective one of said corniform convex portions at a position corresponding to the connection portions in a condition where said pin members are assembled to said corniform block member, and (II) injection molding a material of said cavity plate into said assembled mold.

2. A method according to claim 1, wherein the edge surface of said prism portion has a width and a length equal to those of respective one of said corniform convex portions.

3. A method according to claim 1, further comprising the process of sintering the molded material.

4. A method according to claim 1, wherein said material comprises ceramic.

* * * * *